(12) United States Patent
Randles et al.

(10) Patent No.: US 12,026,673 B2
(45) Date of Patent: *Jul. 2, 2024

(54) AUTOMATED COMPUTER-BASED PREDICTION OF REJECTIONS OF REQUISITIONS

(71) Applicant: Coupa Software Incorporated, San Mateo, CA (US)

(72) Inventors: Zachary Randles, San Mateo, CA (US); David Williams, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/716,861

(22) Filed: Apr. 8, 2022

(65) Prior Publication Data

US 2022/0230141 A1    Jul. 21, 2022

Related U.S. Application Data

(63) Continuation of application No. 14/788,541, filed on Jun. 30, 2015, now Pat. No. 11,328,255.

(51) Int. Cl.
*G06Q 10/10*        (2023.01)
(52) U.S. Cl.
CPC ................. *G06Q 10/103* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 8,250,009 B1 | 8/2012 | Breckenridge | |
| 9,679,261 B1 | 6/2017 | Hoover | |
| 9,898,767 B2 | 2/2018 | Psota | |
| 2002/0087440 A1 | 7/2002 | Blair | |
| 2008/0319897 A1 | 12/2008 | Fahner | |
| 2009/0164274 A1 | 6/2009 | Narayanaswamy | |
| 2010/0057521 A1 | 3/2010 | Jordan | |
| 2014/0101024 A1 | 4/2014 | Li | |
| 2014/0108094 A1* | 4/2014 | Beddo | G06Q 30/0202 705/7.31 |
| 2014/0122355 A1 | 5/2014 | Hardtke | |
| 2015/0317709 A1 | 11/2015 | Zimmerman | |

* cited by examiner

*Primary Examiner* — Arif Ullah
(74) *Attorney, Agent, or Firm* — Baker Botts L.L.P.

(57) ABSTRACT

In an embodiment, an automated computer-based method for improving a computer system to be able to predict rejections of requisitions submitted to the computer system, the method comprising receiving a requisition from a client device; determining, at a scoring unit of a computer system, a probability value indicating a likelihood that the requisition would be rejected if the requisition is submitted to a requisition approval chain; transmitting the probability value from the computer system to the client device to be displayed on a display of the client device.

18 Claims, 11 Drawing Sheets

*Fig. 2a*

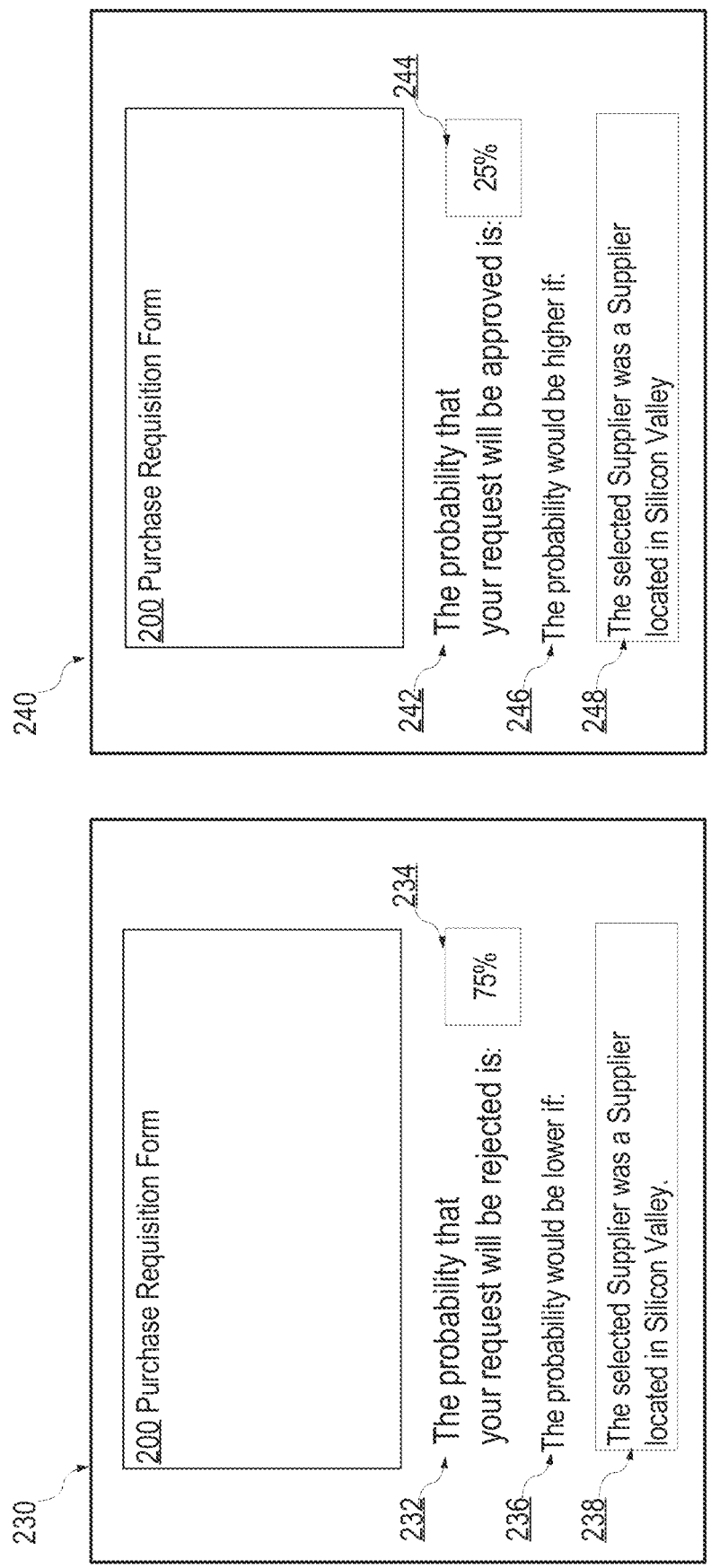

| Feature Name | Source | Speed | Type |
|---|---|---|---|
| On behalf of | History? | ? | Boolean |
| # of policies | ? | ? | Integer |
| Submitter's self-approval limit | User | Fast | Float |
| # of req lines | Lines | Fast | Integer |
| Has Justification | Header | Fast | Boolean |
| Days until need-by date | Header | Fast | Integer |
| Address on req does not equal user's default | Header/User | Fast | Boolean |
| Freeform requests | Lines | Medium | Integer |
| Total price of order | Lines | Medium | Float |
| Non-Preferred Suppliers | Lines, Supplier items | Medium | Integer |
| # of commodities | Lines | Medium | Integer |
| % of items on contract | Lines, Supplier items | Medium | Float |
| % of items with p-card | Lines | Medium | Float |
| # of billing strings that do not match default | Lines | Medium | Integer |
| Has RFQ happened for an item on the req? | Quote Awards? | Medium | Boolean |
| Split billing extra allocation count | Lines | Medium | Integer |
| Submitter rejection % | User | Medium (memoize) | Float |
| Approver rejection % | User | Medium (memoize) | Float |
| # of approvers | Approvals, History? | Medium? | Integer |
| Buyer action required | History | Slow | Boolean |
| Over budget(s) | Lines, Budget | Slow | Integer |
| # of lines with items already in stock | Lines, Inventory | Slow | Integer |
| Req was previously rejected | History | Slow | Boolean |
| # of items on separate order already | Lines, Other req lines | Very Slow | Integer |
| User has previously ordered all items on list? | Previous reqs | Very Slow | Boolean |

AUTOMATED COMPUTER-BASED PREDICTION OF REJECTIONS OF REQUISITIONS

BENEFIT CLAIM

This application claims the benefit under 35 U.S.C. § 120 as a continuation of application Ser. No. 14/788,541, filed Jun. 30, 2015, now U.S. Pat. No. 11,328,255, the entire contents of which are hereby incorporated by reference for all purposes as if fully set forth herein. Applicant(s) hereby disavow any disclaimer of scope occurring in the prosecution history of the parent application and advise the Patent and Trademark Office that the claims in this application may be broader than any prior application based on the same disclosure.

TECHNICAL FIELD

The present disclosure is generally related to improvements in computer-based enterprise procurement systems, and specifically relates to techniques for evaluating purchase requisitions that are submitted to procurement systems based on constraints imposed by an enterprise or industry.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Arranging purchases of goods or services is a common task in business enterprises, and large companies often use a computer-based procurement system to manage creating, reviewing, approving, and communicating requests (or "requisitions") to purchase items in coordination with suppliers or vendors. Requisitions often are subject to a single-step or multi-step approval process in which one or more approvers or approver computers in an approval chain will review and accept or reject a requisition that another user prepared. Additionally or alternatively, requisitions may be subject to rejection if they fail to meet criteria that are embodied in computer-enforced rules, and these rules may be too numerous and/or complex for a human user to remember or apply in preparing a new requisition.

Users who fill out requisitions to be submitted to a procurement system do not receive indications of approval prior to actually submitting the forms to the system and it is not possible for the typical user to predict whether requisitions will be rejected. After rejection, users are required to revise and resubmit a requisition again, facing the possibility that the requisition could be rejected again. The process of repeatedly submitting requisitions may be time consuming and inefficient. The resubmitting process may unnecessarily consume various computer resources, put demands on bandwidth of computer networks and impede efficient operation of the enterprise.

BRIEF DESCRIPTION OF THE DRAWINGS

FIG. 2*a* depicts an embodiment of a user interface display for generating a purchase requisition entry;

FIG. 2*b* depicts an embodiment of a user interface display for providing a prediction that a requisition will be rejected;

FIG. 2*c* depicts an embodiment of a user interface display for providing a prediction that a requisition will be approved;

FIG. 6*b* depicts examples of features provided as input data to neural networks;

DESCRIPTION OF EXAMPLE EMBODIMENTS

Figure 1:
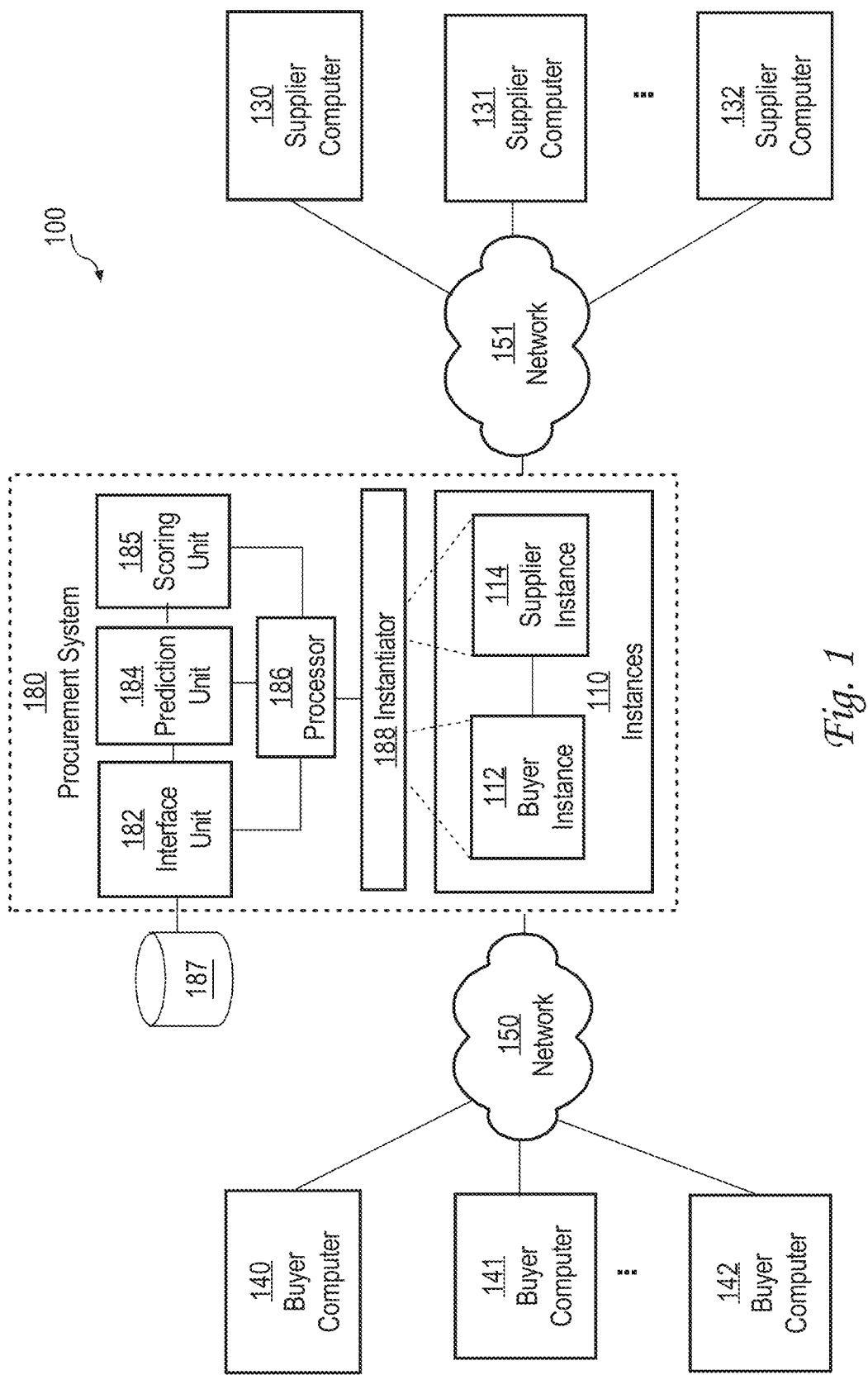
FIG. 1 depicts an embodiment of a data processing system that is programmed or configured to automatically predict whether a requisition will be rejected.

In the following description, for the purposes of explanation, numerous specific details are set forth in order to provide a thorough understanding of the present approach. It will be apparent, however, to one skilled in the art that the present approach may be practiced without these specific details. In other instances, well-known structures and devices are shown in block diagram form in order to avoid unnecessarily obscuring the present approach.

Embodiments are described herein according to the following outline:

1.0 Overview
2.0 Structural and Functional Overview
3.0 Example User Interfaces
4.0 Automated Computer-Based Processes for Predicting Rejections of Requisitions
5.0 Example Neural-Network-Based Implementation
6.0 Example Query-Based Implementation
7.0 Example Prediction-Algorithm-Based Implementation
8.0 Implementation Mechanisms—Hardware Overview 1.0 Overview In an embodiment, a computer-implemented method, an apparatus and a computer program are provided for predicting the likelihood that a requisition will be rejected by a procurement system. In one approach, an automated computer-based method for improving a computer system by determining a likelihood that a request will be rejected if the request is submitted to the computer system comprises, using the computer system, receiving electronic digital requisition data representing the requisition from a client device that is coupled to the computer system via a network, wherein the requisition data comprises a plurality of different requisition data values identifying at least a vendor, one or more products that the vendor is to supply, and one or more metadata values from among order date, date required, shipper, freight terms, shipping address; using a scoring unit of a computer system, based on the requisition data values, determining a probability value indicating a likelihood that the requisition will be rejected if the requisition is submitted to the computer system for processing in an approval chain that comprises a series of approval computers; using the computer system, generating display data that includes the probability value; using the computer system, causing the client device to display the display data including the probability value in association with at least a portion of the requisition.

Determining whether a requisition will be rejected may be based on evaluating a variety of factors. The factors may be derived from data included in training requisitions, requisitions processed by the procurement system in the past, profiles of users, profiles of suppliers, product inventory, enterprise rules, industry standards and policies, and the like. As a user completes a requisition, or after a requisition is complete, the system disclosed herein may evaluate the requisition and/or one or more entries in the requisition based upon one or more of the above factors, determine a probability that the requisition will be rejected if the form is actually submitted, and display an indication of the probability at a user computer. The probability indication may be represented in a variety of ways, including numerical values, comments, or combinations of both.

In an embodiment, predictions whether requisitions will be rejected or approved by a procurement system are provided to user computers in real time. For example, as a user computer receives data input from a browser for data specified in input boxes of a requisition, the data input may be provided to procurement system for determining, based on the requisition as a whole or one or more entries, a prediction value specifying whether the requisition will be rejected or approved if actually submitted to the procurement system or actually subjected to the entire approval chain. The prediction may be provided to the browser, and the browser may display the prediction at the user computer. Hence, as the user fills out a requisition, or upon completion of a requisition and before submitting the requisition, the user may observe the probability value and/or changes in the probability value and can use the information about the changes to gauge the user's chances to have the requisition approved when it is submitted. Furthermore, by observing the changes in the probability, the user may determine ways to revise the requisition to increase the chances of having the requisition approved.

"Approval chain," in this context, may refer to one or more computers that are associated with programmed logic that is configured to review a requisition or other request according to rules, criteria or other logic. "Approval chain" also may refer to individual approver personnel and/or their computers and embodiments are specifically directed to implementations that are fully automated.

The probability value may be expressed in a variety of ways. For example, the probability value may be represented using various objects or widgets in a graphical user interface display at the user computer, including numerical indicators, texts, graphical objects, color bars, color labels, and the like. The objects may have different designs and interactivity capabilities. The probability value is displayed typically in association with at least a portion of the requisition. For example the entire requisition may be shown on the display screen and the probability value may be shown in a sub panel, side panel, pop-up window, overlay, or otherwise logically near or on the requisition data or a portion of the requisition data.

In an embodiment, the probability value is represented using a probability indicator at the user computer. A probability indicator may be a numerical value that has been selected from a probability value range or calculated based upon an algorithm and input criteria. Examples of probability value ranges may include [0%, 100%], [0, 100], [0, 10], [0, 1], [−1, 1], and the like. For example, if a probability value of 55% indicates that a requisition has a 55% chance of rejection and a 45% chance of approval.

In addition to displaying probability indicators, a procurement system may display comments, suggestions and recommendations based upon the probability value. For example, a procurement system may retrieve from storage and cause displaying an explanation as to why a probability indicator indicates a high probability that a particular requisition will be rejected if submitted. Furthermore, the system may display one or more suggestions for revising the requisition to reduce the probability of rejection, and/or comments related to drafting and preparing the requisitions.

Although the disclosure refers herein to requisitions submitted to procurement systems, the approach may be implemented for a variety of requests other than purchase requisitions. The requests may include invoices, expense report submissions, personal requests, employee suggestion submissions, and any other documents, forms or datasets that are subject to approval and rejection. The approach may also be implemented for servicing requests unrelated to procurement services and invoice processing. The requests may be submitted to various computer systems, not only to procurement computers.

In predicting the likelihood that a requisition will be rejected or approved, a procurement system may use account information provided by various parties and retrieved from various sources. Examples include data in a requisition. For example, the system may use a count of the requested items in the form, information about availability of items, whether the requested items were approved in the past, whether the requested items meet a quality threshold, whether a supplier of the requested items is local, whether fulfilling similar requests for similar items was successful in the past, and information about users, suppliers and approvers to determine their reputation and dependability.

The procurement system may also check whether a justification for requesting the items is in the requisition. If a justification is provided, then the procurement system may parse the justification content to identify keywords or phrases, and check or test whether those keywords or phrases have been also used in the requisitions that were approved in the past.

In determining a likelihood that a requisition for a particular item from a particular supplier will be rejected, the procurement system may also check or test information that has been generated based on orders that were approved and/or rejected in the past by the same enterprise or other enterprises. For example, the procurement system may use statistical information that has been generated based on previously submitted orders for the same items, to the same supplier, from the same requestor, and by various companies or within an industry. The statistical information may be retrieved from local and/or global data repositories. Local data may include data applicable to a particular company, while global data may include data applicable to multiple enterprises and/or an entire industry.

Other data that is used to predict whether a requisition will be rejected may include purchasing guidelines implemented by the company, policies and recommended business practices within the company or within an industry, and the like. For example, a prediction system may use information about items that are encouraged for purchase, information about items that are discouraged for purchase, and the like.

Information that a procurement system uses to determine the likelihood that a requisition will be rejected may be obtained by or provided to the procurement system in various forms and from various sources. For example, the information may include electronic data, documents, data spreadsheets and the like. The information may be retrieved from databases, severs, and the like. The information may be queried or otherwise obtained, and used to evaluate requisitions received from users to determine likelihood that the requisitions will be rejected or approved.

2.0 Structural and Functional Overview

FIG. 1 depicts an embodiment of a data processing system configured to automatically predict whether a requisition will be rejected. In an embodiment, a data processing system 100 comprises a procurement system 180 that executes an automated computer-based process to predict whether requisitions will be rejected. Procurement system 180 may include a plurality of components and units that are programmed communicate and interact with each other and other components of system 100. For example, procurement system 180 may include one or more interface units 182, one or more prediction units 184, one or more scoring units 185, one or more processors 186 and one or more instantiators 188. The components may have access to one or more internal or external databases 187 directly or indirectly through one or more networks 150, 151. A description of the programming, configuration and functional operation of the foregoing units is provided in the following sections.

Interface unit 182 is programmed to provide access to and from procurement system 180. For example, interface unit 182 may facilitate entering data to procurement system 180, retrieving data from procurement system 180, exchanging data between components of procurement system 180, and the like.

Prediction unit 184 is programmed to cooperate with scoring unit 185 in predicting rejections of requisitions before the requisitions are actually submitted to approval chains. "Requisition," in this context, refers to electronically stored digital data that represents a request and typically comprises a data structure, record or other set of multiple data values that define a requester, vendor, product or service line items, and metadata such as dates, shipment method, freight terms, shipment address and the like. Determining the likelihood of rejection may be programmed using a variety of approaches, including using a neural network and a query based approach as further described herein. Prediction unit 184 and scoring unit 185 may also be programmed to generate suggestions for revising the requisitions to increase the likelihood that the requisitions will be approved.

Prediction unit 184 and scoring unit 185 may be programmed to operate in parallel or sequentially. For example, one unit may delegate tasks to another, and wait for a response before proceeding any further. In an embodiment, prediction unit 184 pre-processes entries of a requisition, uses the pre-processed information to formulate a query and sends the query to scoring unit 185. Scoring unit 185 may be programmed to execute algorithms to determine the likelihood that the requisition will be rejected and to transmit the determined probability value to prediction unit 184, which may provide the value to a client device or user computer or as output in another form.

Processor 186 may be any type of a hardware or hardware-programmable processor, such as a central processing unit (CPU), a microprocessor, microcontroller, etc. Processor 186 may initiate and control execution of programming instructions that are stored by or embodied in the other components.

Instantiator 188 is programmed for instantiating one or more buyer instances 112, one or more supplier instances 114, and other instances of threads or processes. The instances and the processes of instantiating the instances are described below.

In an embodiment, system 100 also comprises one or more buyer computers 140, 141, 142, from which users access procurement system 180 of the business enterprise. Examples of buyer computers 140, 141, 142 may include smartphones, smartwatches, tablets, laptops, personal computers, and any other computer devices configured to receive, process, and transmit data. Buyer computers 140, 141, 142 may be configured in an approval chain that comprises a series of approval computers each associated with approvers responsible to review and approve requisition data. The term "buyer computer" and "supplier computer" may refer broadly to an end user computer that is associated with or used by any kind of user, and use in a procurement system, by buyers and suppliers respectively or in business enterprises is not required. A user computer may access procurement system 180 by requesting that one or more instances 110 of a procurement application be generated or spun-up for the user computer. The user computer may access instances 110 of the procurement application via one or more computer networks 150. Example instances include buyer instances 112 and supplier instances 114. The buyer computers 140, 141, 142 may request and interact with various buyer instances 112 of a procurement system application directly or via one or more computer networks 150. Buyer instances 112 may be created by an instantiator 188. The supplier computers 130, 131, 132 may request and interact with various supplier instances 114 of a procurement system application directly or via one or more computer networks 151. Supplier instances 114 may be created by instantiator 188.

For example, using a browser, a buyer computer 140 may request creating buyer instance 112, and access buyer instance 112 via computer network 150. As the buyer computer 140 accesses instances 112 and composes a purchase requisition, one or more instances 114 may be created to enable communications with one or more supplier computers 130, 131, 132.

Once buyer instance 112 is instantiated and is running, a graphical user interface (GUI) may be generated and displayed on a display device of buyer computer 140. Using the GUI, buyer computer 140 may interact with buyer instance 112, compose requisitions, expense reports, and the like. For example, a purchase requisition may specify ordering certain items from a certain supplier, and the buyer computer 140 may submit the requisition to the procurement system for review. Examples GUIs that are configured for providing requests to the procurement system are in FIG. 2a, FIG. 2b, FIG. 2c, and FIG. 3.

Upon receiving a submission of a purchase requisition to purchase certain items from a particular supplier, procurement system 180 may instantiate one or more supplier instances 114 to facilitate access to one more supplier computers 130, 131, 132 accessible to suppliers. For example, a supplier instance 114 may be created to interact with data stored in a supplier computer 130 to determine whether the supplier has sufficient quantity of the requested items.

Supplier instances 114 may also be created upon requests generated by users of supplier computers 130, 131, 132. For example, using a browser, a user of supplier computer 130 may request an instantiation of supplier instance 114 of a procurement application, and access supplier instance 114 to check whether any orders to be fulfilled by the supplier have been submitted to the procurement system.

If a requisition request is submitted to procurement system 180, procurement unit 184 and scoring unit 185 may cooperate with each other, evaluate various factors, and execute various algorithms to determine likelihood that the requisition request would be rejected. The outcome is communicated to a browser executed on buyer computer 140 and displayed for the user. Based on the displayed information, the user computer may generate and submit a modified requisition that has greater chances of approval.

3.0 Example User Interfaces

In an embodiment, automated computer-based prediction of rejections of requisitions utilizes one or more user interfaces for enabling interactions with user computers and/or users. The interfaces may be implemented as GUIs that are generated by web browsers which are executed on client devices and displayed on display devices of the client devices, such as buyer computers 140, 141, 142 or supplier computers 130, 131, 132. The GUIs may have different designs and different capabilities. For example, some GUIs may display interactive text boxes and allow users to enter information to the text boxes. Other GUIs may display pull-out menus and allow users to select options from the pull-out menus. Embodiments are not limited to any type of user interface or GUI.

Figure 2A:
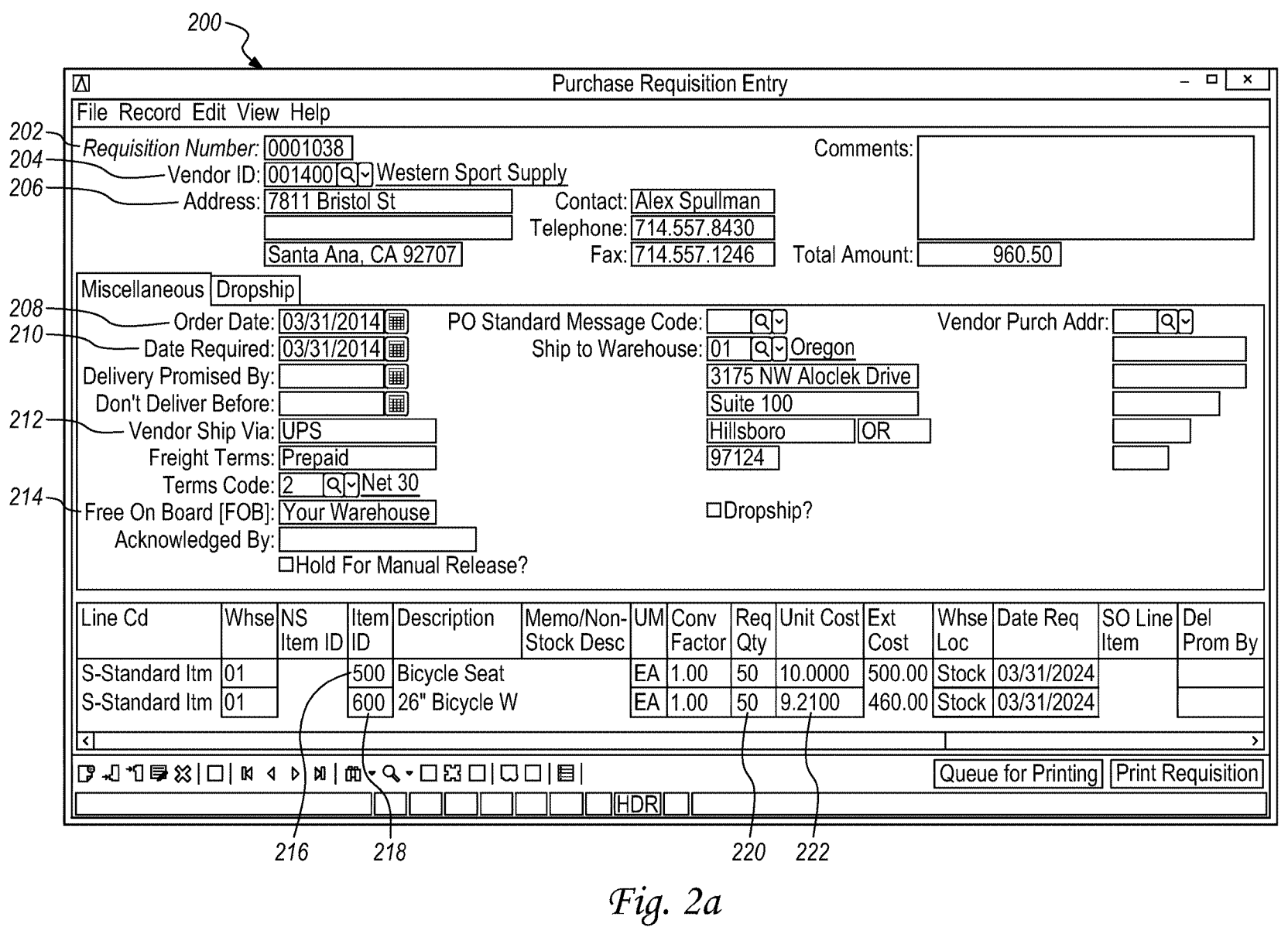

FIG. 2a depicts an embodiment of a user interface display for generating a purchase requisition entry. In an embodiment, a user interface display for generating a purchase requisition entry comprises a purchase requisition form 200. The term "purchase requisition form" refers broadly to electronically stored digital data representing requisitions, requests, and other electronic documents that are used in any form of workflow or process that has review and/or approval steps in which a rejection action may occur via another user, computer or terminal. Form 200 may include one or more interactive elements, such as pull-out menus, text labels and text boxes. Formats of purchase requisition form 200 may vary in different implementations.

In the example of FIG. 2a, purchase requisition form 200 is configured or programmed to accept a requisition number 202 of a requisition, a vendor identifier 204 of a supplier from whom certain items are requested, address information of the supplier, and the like. A user computer may also provide identifications 216, 218 of the requested items, a quantity 220 of each of the requested items, a unit cost 222 of each of the requested items, and the like. Additional information may include supplier contact information, a supplier phone number, a supplier fax number, and the like.

Purchase requisition form 200 may also be configured or programmed allow a user computer to provide a date 208 when the order was prepared, a date 210 by which the requested items are expected, a description 212 of the method for delivering the requested items, and contract-specific information 214, such as an indication whether the supplier pays a loading cost and a cost of transporting the goods to the port of shipment. Additional information that the user computer may enter into purchase requisition form 200 may include instructions for the goods delivery, information about the method of acknowledging the receipt of the requested items, information about the warehouse at which the items are to be delivered, and the like. Furthermore, a user computer may provide comments, special instructions for handling the requested goods, and the like.

In an embodiment, a prediction whether a requisition will be approved is provided as an update before a user computer submits a requisition form itself to a procurement system.

The prediction may be represented using a prediction indicator, and the indicator may be updated and displayed for a user computer as the requisition form is filled. Therefore as the user computer is completing the requisition form, the user computer may receive data indicating changes in the probability indicator. The user computer may use the displayed information to determine whether the requisition form is likely to be approved after the changes. Furthermore, the user computer may determine how to revise the form to have the requisition approved. Additionally or alternatively, prediction values may be generated and provided after a complete requisition is submitted to the computer system but before the requisition is released to an approval chain that the computer system manages.

FIG. 2b depicts an embodiment of a user interface display 230 for providing a prediction that a requisition will be rejected. In display 230, a user computer is completing purchase requisition form 200 by providing information described in FIG. 2a. As the user computer is entering the information to form 200, a probability indicator 234 is displayed on a display of the user computer. In addition, a description 232 associated with probability indicator 234 may be displayed. Additionally or alternatively, prediction values may be generated and provided after a complete requisition is submitted to the computer system but before the requisition is released to an approval chain that the computer system manages.

In the example of FIG. 2b, description 232 comprises probability indicator 234 and indicates the probability that a requisition form will be rejected if the form is submitted to an approval chain as is. In an embodiment, as the user computer fills out additional text boxes of form 200, the value of probability indicator 234 may increase or decrease. In the depicted example, probability indicator 234 indicates a value of 75%, which means that the requisition form has a 75% likelihood of rejection if the form is submitted as is.

In addition, display 230 may include comments and suggestions for improving the probability that requisition form 200 will be approved. For example, display 230 may include a text label 236 stating suggestions which if accepted should decrease the probability that the request would be rejected. A recommendation or a comment may be included in a comment text box 238. In the depicted example, comment text box 238 states a recommendation to select a supplier located in Silicon Valley. Other types of comments and suggestions may also be provided. For example, display 230 may provide recommendations for changing a delivery date, changing instructions for handling the requested items, and the like.

FIG. 2c depicts an embodiment of a user interface display 240 for providing a prediction that a requisition will be approved. In display 240, a user computer is completing purchase requisition form 200 by providing information described in FIG. 2a. As the user computer is entering the information to form 200, a probability indicator 244 and a description 242 of probability indicator 244 may be displayed. Additionally or alternatively, prediction values may be generated and provided after a complete requisition is submitted to the computer system but before the requisition is released to an approval chain that the computer system manages.

In the depicted example, description 242 states that probability indicator 244 indicates the probability that a requisition form will be approved if the form is submitted to approval chains as is. As the user computer fills out additional text boxes of form 200, the value of probability indicator 244 may increase or decrease. In the depicted example, probability indicator 244 indicates a value of 25%, which means that the requisition form has a 25% probability of approval if submitted as is. Additionally or alternatively, prediction values may be generated and provided after a complete requisition is submitted to the computer system but before the requisition is released to an approval chain that the computer system manages.

In addition, display 240 may include comments and suggestions for improving the probability that requisition form 200 will be approved. For example, display 240 may include a text label 246 that states suggestions which, if used, should increase the probability that the request would be approved. A recommendation or a comment may be included in a comment text box 248. In the example of FIG. 2c, comment text box 248 states a recommendation to select a supplier located in Silicon Valley. Other types of comments and suggestions may also be provided. For example, display 240 may provide recommendations for changing a delivery date, changing instructions for handling the requested items, and the like.

Other types of displays 230, 240 may also be provided. For example, a display that combines displays 230 and 240 may be provided. In such a display, both indicators 234 and 244 may be displayed. The indicators may be represented using percentage values, as in FIG. 2b, FIG. 2c, or using other types of values.

4.0 Automated Computer-Based Prediction

In an embodiment, automated computer-based prediction of rejections of requisitions is implemented in a procurement system that includes programmed computing components as shown in FIG. 1. Other embodiments may use general-purpose computers that are programmed to perform functionally similar operations, or special-purpose computers that are programmed or configured specifically to perform the operations that are described herein. Each flow diagram provided herein is intended to depict an algorithm and/or functional specification for programming instructions that can be used to implement, using a computer, the operations that are described.

Figure 3:
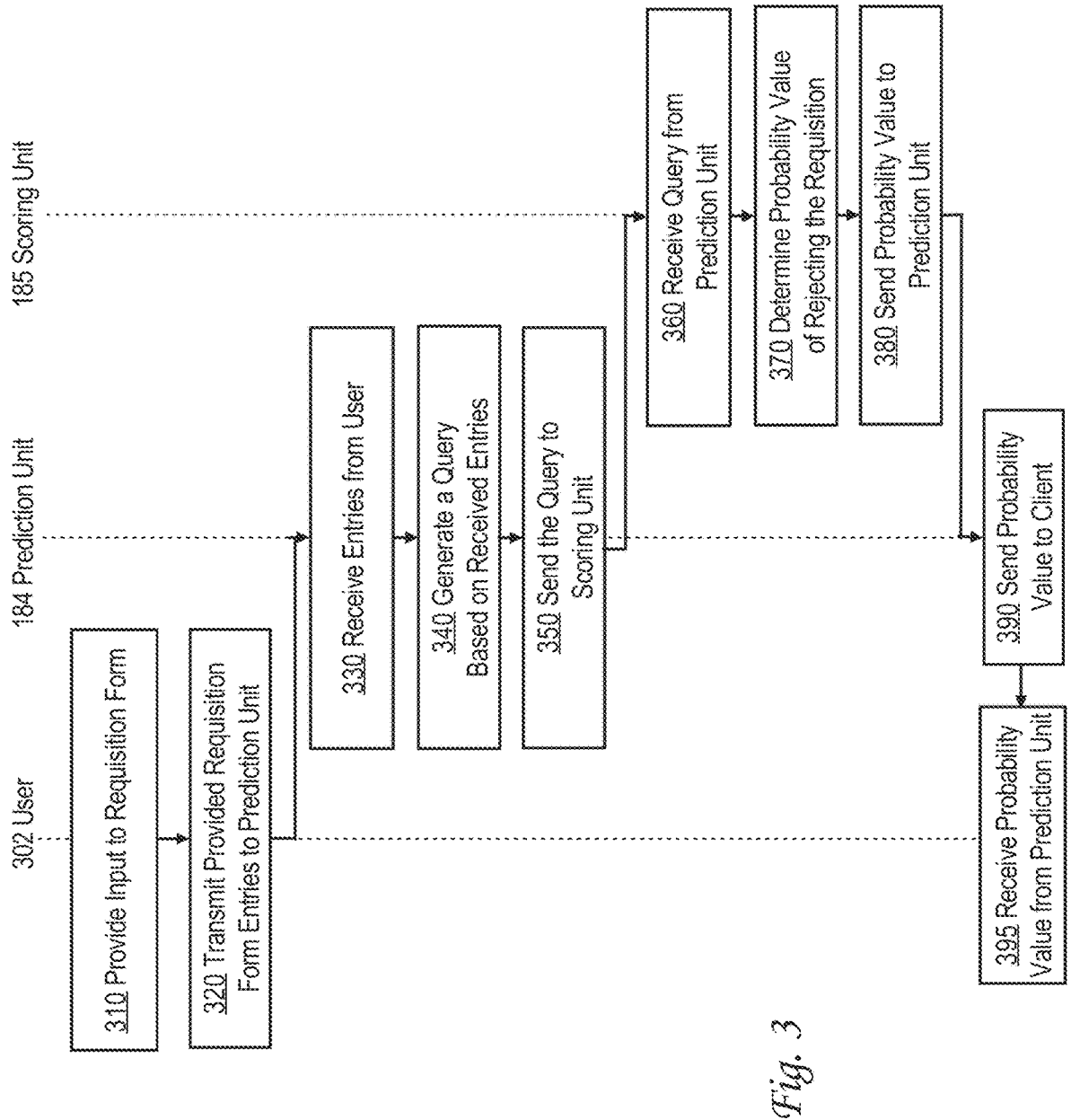
FIG. 3 depicts a time chart for an automated computer-based prediction process for predicting rejections of requisitions.

FIG. 3 is a time chart for an automated computer-based prediction process for predicting rejections of requisitions. The time chart depicts tasks performed by a user 302 of buyer computer 140, tasks performed by components of procurement system 180, including prediction unit 184 and scoring unit 185.

In step 310, user computer 302 accesses a procurement system application, and using a GUI generated by the procurement application, composes a requisition. The requisition may be a purchase request, such as the one depicted in FIG. 2a, or any other request, such as an invoice, an expense report, a personal request, and the like. A requisition may be composed by selecting a particular request form or a template from a list of forms or templates that are displayed on a display device and filling out text boxes of the form. Examples of various types of information that a user computer may enter into a requisition form are provided in FIG. 2a, FIG. 2b, and FIG. 2c. The user computer may revise, delete, archive, and save the form, create a new requisition, access previously saved requisitions, display one or more requisitions, and the like.

As a user computer is filling out a requisition form, input provided by the user computer are transmitted to prediction unit 184 in step 320; in this approach the input is transmitted to prediction unit 184 even though the requisition form itself is not, possibly in real time as the user computer creates input or the form. In other embodiments, an entire requisition or form is submitted as a unit and processed using subsequent steps.

In step 330, prediction unit 184 receives entries provided by user computer 302.

In step 340, prediction unit 184 generates a query based on contents of the provided entries. Prediction unit 184 may reformat the provided entries, and use the reformatted information to generate a query in the format that scoring unit 185 may process.

In step 350, prediction unit 184 sends a query to scoring unit 185.

In step 360, scoring unit 185 receives a query from prediction unit 184. Scoring unit 185 may parse the received query and identify one or more pieces of information specific to the requisition composed by user computer 302. Furthermore, scoring unit 185 may access one or more internal and/or external databases, and query the databases for historical data pertaining to a requisition approval process. For example, scoring unit 185 may retrieve information about similar queries submitted by users in the past, information about user computer 302, information about policies, guidelines and recommendations, and the like.

In step 370, based on data specific to a received query and data retrieved from various sources, scoring unit 185 determines a probability that a requisition, if submitted by user computer 302 to a procurement system as is, will be rejected or accepted. For example, scoring unit 185 may determine a probability value indicating likelihood that the requisition will be rejected by a procurement system if the requisition is actually submitted to the procurement system as is. In an embodiment, scoring unit 185 may use historical requisition approval/rejection data, neural networks and predictive algorithm to calculate a rejection score, which may represent a measure of how likely a given requisition is to be rejected.

In addition, scoring unit 185 may determine one or more suggestions or comments to improve likelihood that a requisition composed by user computer 302 will be approved. For example, scoring unit 185 may determine suggestions for rewriting the requisition by changing a supplier from whom the items are requested, changing a requested delivery date of the requested items, changing a quantity of the requested items, and the like.

In step 380, scoring unit 185 sends a probability value, indicating how likely a given requisition is to be rejected or approved, to prediction unit 184. Scoring unit 185 may also send to prediction unit 184 one or more comments and suggestions for improving likelihood that the requisition will be approved.

In step 390, prediction unit 184 receives a probability value determined for requisition entries provided by user computer 302 in step 320. Prediction unit 184 may also receive one or more comments or suggestions if such have been determined. Prediction unit 184 may reformat the probability value and the comments/suggestions to the format that is understandable by a browser executed by a user device of user computer 302, and send the reformatted information to the browser.

In step 395, user computer 302 receives information from prediction unit 184. The received information may include a probability value and comments, both represented using alpha-numerical strings. A probability value may represent a score value computed based on, at least in part, the entries provided by user computer 302 into a requisition form. A score value may correspond to an approval-score-value or a rejection-score-value. In some implementations, both an approval-score-value and a rejection-score-value may be provided. The information may be presented to user computer 302 in a variety of forms. For example, the information may be displayed on a GUI generated by a browser that user computer 302 executes.

A score value may be displayed on a display of the user computer 302 along with recommendations for improving the score. The recommendations may provide suggestions on how to revise a requisition form to improve likelihood that the requisition submitted by user computer 302 will be approved.

Based on the displayed information, user computer 302 may determine whether submitting the particular requisition to a procurement system 'as is' is prudent. For example, if the displayed information includes an indication that an approval-score-value is 80% or higher, then user computer 302 may submit the requisition to the procurement system as is. However, if a displayed rejection-score-value is 50% or higher, then user computer 302 may either forgo submitting the requisition to the procurement system or consider comments and suggestions for improving the score. Hence, if a displayed rejection-score-value is 50% and the displayed comments include a suggestion to revise the requisition by changing a supplier, then user computer 302 may revise the requisition form as suggested, receive a new score value computed for the revised form, and then decide whether to submit the revised requisition to the procurement system.

In situations when a score value is relatively low and no comments or suggestions are provided for rewriting the requisition, user computer 302 may either skip the step of resubmitting the requisition or rewrite the requisition form.

In an embodiment, score values are also provided to requisition approval chains to provide the approval chains with information about the attempts made by users to submit requisitions. The score values may be provided to the requisitions approval chains using electronic digital means including email or programmatic messaging, and/or displayed on computer displays of the approval chains. The score values may be provided to the approval chains at the time the score values are determined. Alternatively, the score values may be provided to the approval chains at the time the requisitions are actually submitted to the procurement system.

Providing score values to requisition approval chains has many benefits. For example, the score values determined at the times when the users submitted or revised their requisitions may be treated by the approval chains as additional data points about the users. The values may also provide the approval chains with the information on a count of the retries and the ways the users modified their requisitions before actually submitting the requisitions to the approval chains. That information along with the actually submitted requisitions may be analyzed by the approval chains in accordance with the company and industry standards.

In an embodiment, score values are also provided to suppliers to provide the suppliers with information about requested items, requestors, and the like. The score values may be provided to the suppliers using digital communications or messaging and/or displayed on displays of the computers of the suppliers. The score values may be provided to the suppliers at the time the values are determined, and/or at the time the approved requisitions are forwarded to the suppliers. The score values may be used by the suppliers to determine the products that a particular company is likely to approve for purchase and/or to determine the products that companies within a particular industry are likely to approve for purchase.

Figure 4:
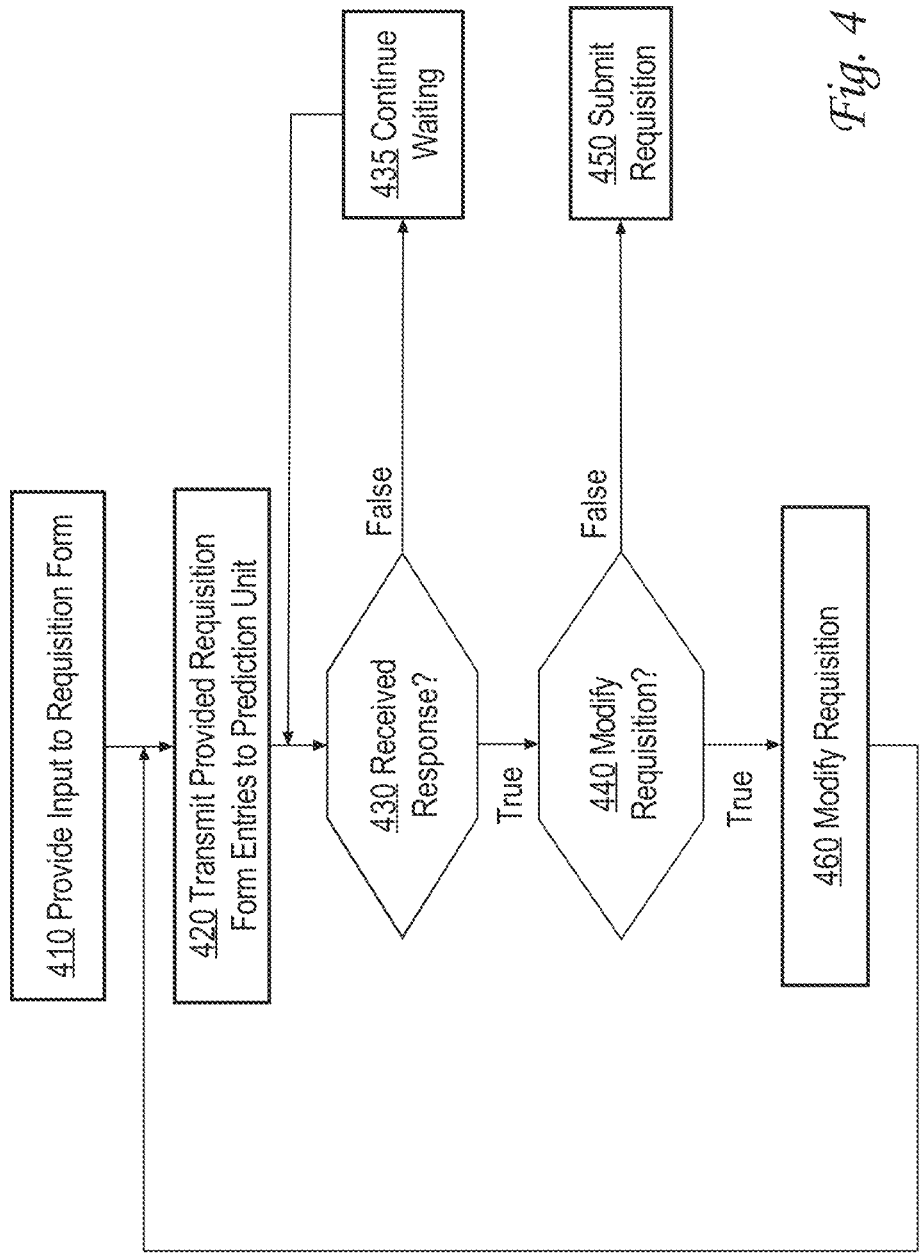
FIG. 4 depicts a client process executed to automatically predict whether a requisition will be rejected.

FIG. 4 depicts a client process executed to automatically predict whether a requisition will be rejected.

In step 420, a user computer accesses a procurement system application, and using a GUI generated by the procurement application, composes a requisition. The requisition may be a purchase request, such as the one depicted in FIG. 2a, or any other request, such as an invoice, an expense report, a personal request, a memorandum to the management, and the like.

A requisition may be generated by selecting a particular request form or template from a list of forms/templates displayed on a display device in a form of a GUI, having the request form displayed in the GUI, and filling text box of the request form with the requisition-specific-information. Examples of various types of information entered by the user in a requisition form are provided in FIG. 2a, FIG. 2b, and FIG. 2c. The user computer may revise, delete, archive, and save the requisition, create a new requisition, access previously saved requisitions, display one or more requisitions, and the like.

As a user computer is filling out a requisition form, inputs provided by the user computer are transmitted to prediction unit 184 in step 420. The inputs are transmitted to prediction unit 184 even though the requisition form itself is not. The inputs are transmitted in real time as the user computer provides them in the form. Additionally or alternatively, prediction values may be generated and provided after a complete requisition is submitted to the computer system but before the requisition is released to an approval chain that the computer system manages.

In step 430, the user computer checks whether a response indicating likelihood that the requisition will be rejected or approved is received. The response may be displayed on a GUI generated by a browser that the user computer executes, and presented in a variety of forms. For example, the received information may include a score value and comments represented using alpha-numerical strings. The comments may include recommendations for improving the score value indicating likelihood that the requisition submitted by the user computer will be approved.

If the response is not received, then, in step 435, the user computer continues waiting for the response. Otherwise, in step 440, the user computer analyzes the received response to determine whether the requisition may be modified.

If a user computer receives a response indicating a relatively high approval-score-value, which corresponds to a high probability that the requisition will be approved, then the user computer may proceed to step 450. In step 450, the user computer may submit the requisition "as is" to the procurement system for the requisition approval chains to make a determination whether indeed to approve the requisition.

However, if a user computer receives a response that indicates a relatively high rejection-score-value, then the user computer may rewrite the requisition to increase the likelihood that the requisition will be approved in the requisition chain. For example, if the rejection-score-value is relatively high, and thus indicates that the likelihood of having the requisition rejected by the requisition approval chains is relatively high, then the user computer may check whether any comments or suggestions for rewriting the requisition submission have been provided. If such have been provided, or if the user knows or can guess how to rewrite the requisition submission, then in step 460, the user computer may rewrite the requisition, and then, proceed to step 420. In step 420, the user computer may have the revised entries resubmitted to the procurement system. For example, if the displayed information includes the comments that indicate that revising the requisition by changing a supplier may increase the chances that the requisition will be approved, then the user computer may revise the requisition form as suggested in the comments, and proceed to step 420.

If a user receives a response that indicates a relatively high rejection-score-value, but the system has not provided any comments or suggestions for rewriting the requisition or the user is unable to rewrite the requisition, then the user computer may either submit to the procurement system the requisition "as is" despite the relatively high-rejection-score, or forgo submitting the requisition to the system.

Since the scores determined by a prediction unit and a scoring unit of a procurement system correspond to relative measures, and the criteria for determining the scores may change dynamically, a user computer may want to submit a requisition to the procurement system despite receiving a relatively unfavorable score for the requisition. In fact, a user computer may be unaware of a threshold value that an approval chain will apply to a particular requisition at the time the approval chain reviews the requisition. Furthermore, due to the time difference between the time when a score is computed for a requisition and the time when an approval chain actually reviews the requisition, a threshold for determining the score and a threshold for approving the requisition may be different. Hence, the user computer may hope that the threshold applied by the approval chain at the time the user's requisition is reviewed may be more favorable, and thus resubmit the requisition despite receiving a relatively unfavorable score.

Most likely though, upon receiving a response that indicates a relatively high rejection-score-value for a particular requisition, a user computer may want to revise the requisition form before submitting the requisition to the requisition approval chains. Even if the system has not provided suggestions or comments for rewriting the requisition form, it may be prudent for the user computer to resubmit the requisition in modified form.

Figure 5:
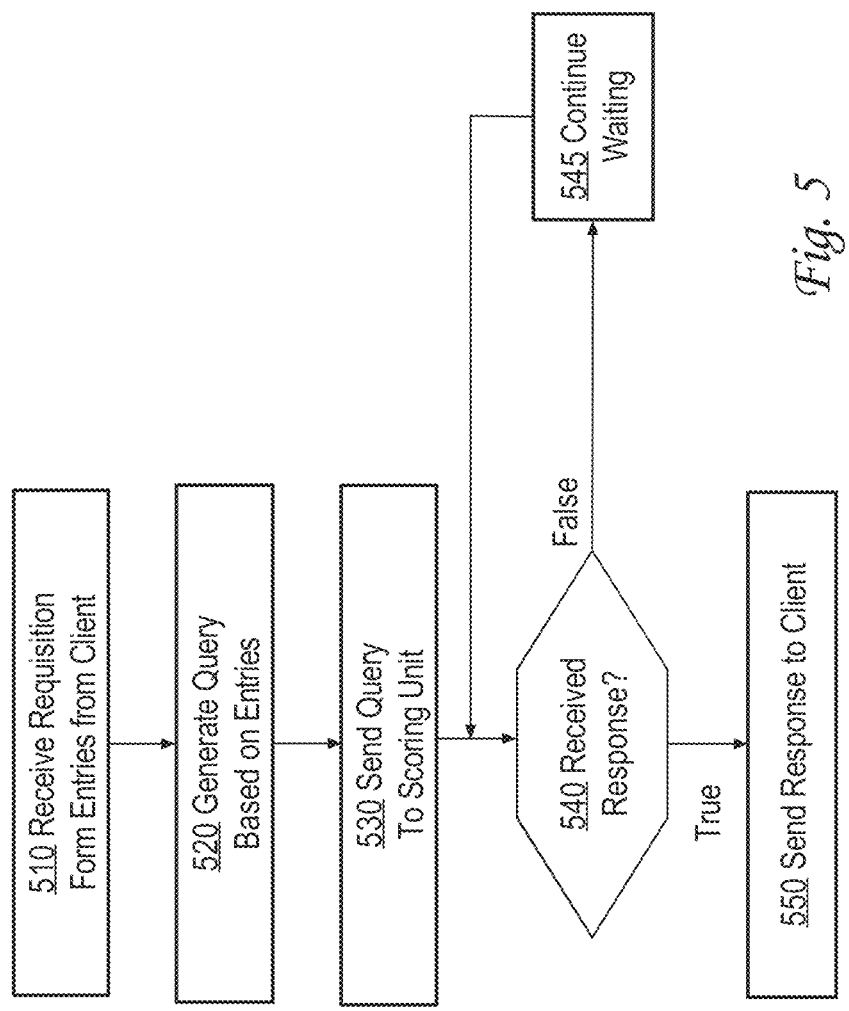
FIG. 5 depicts a computer system process to automatically predict whether a requisition will be rejected.

FIG. 5 depicts a computer system process to automatically predict whether a requisition will be rejected.

In step 510, a prediction unit of a procurement system receives entries provided by a user to a client computer as the user composes a requisition form using the client computer. The requisition form may correspond to any type of request, including a purchase requisition, an expense report, a personal request, and the like.

In step 520, a prediction unit generates a query based on the contents of the received entries. The prediction unit may reformat the received information, and use the reformatted information to generate a query in the format that a scoring unit of the procurement system may process.

In step 530, a prediction unit sends a query to a scoring unit of the procurement system.

Upon receiving a query, a scoring unit may parse the received query and identify one or more pieces of information specific to the requisition entries provided by the user. Furthermore, the scoring unit may access one or more internal and/or external databases, and query the databases for historical data pertaining to a requisition approval process. For example, the scoring unit may retrieve information about similar queries submitted by users in the past, information about the user who submitted the requisition based on which the query is generated, information about policies, guidelines and recommendations, and the like.

Based on data specific to the received query and data retrieved from various sources, a scoring unit determines a probability that a requisition, if submitted by a user to a procurement system as is, will be rejected or approved by requisition approval chains. For example, the scoring unit may determine a score value indicating likelihood that the requisition will be rejected or approved by the approval chains if the requisition form is submitted as is.

Depending on the implementation, a scoring unit may determine one score value or two score values. In one implementation, a score value may represent a probability that the requisition form will be rejected. In another implementation, a scoring unit may determine one score value that represents a probability that the requisition will be approved. In other embodiment, a scoring unit may determine two values: an approval-score-value and a rejection-score-value.

In addition, scoring unit 185 may determine one or more suggestions or comments regarding rewriting the requisition submitted by the client to improve likelihood that the requisition will be approved. For example, a scoring unit may suggest changing the quantity of the requested items, and the like.

In step 540, a prediction unit receives one or more score values determined for entries submitted by a user. Optionally, in addition to the score values, the prediction unit may receive one or more comments or suggestions if such have been determined.

In step 550, a prediction unit reformats the received score values and the comments/suggestions to the format that is understandable by a browser executed on a user computer of a user, and sends the reformatted information to the browser.

Upon receiving the information from a prediction unit of the procurement system, the information may be displayed on a GUI generated by a browser that a user executes on the user's computer. The information may be presented to the user computer in a variety of forms. For example, the received information may include one or more score values and comments represented using alpha-numerical strings.

Based on the displayed information, a user computer may determine whether submitting a particular requisition form to a procurement system is prudent, whether the particular requisition form is to be revised, or whether submitting of the requisition is to be relinquished. Various deduction processes available to the user computer are described above.

In an embodiment, a prediction unit of the procurement system provides the score values determined for requisition entries also to requisition approval chains. The score values may be provided to the approval chains using digital communications, and/or displayed on computer displays of the approval chains at the time the score values are determined and/or at the time the requisitions are actually submitted to the approval chains. The score values may also be provided to suppliers. Approval chains and suppliers may use the received score values as additional data points about the users, the requisitions, polices and industry standards.

5.0 Example Neural-Network-Based Implementation

In an embodiment, an automated computer-based prediction of rejections of requisitions is implemented using a neural-network-based approach. The application may be customized to needs and requirements of a particular business enterprise, or may be customized to one or more sets of requirements provided by various companies specializing in various technological areas. The implementation may be incorporate customized modules, as well as generic modules, open-source code, licensed components, and the like. For example, a procurement system application may incorporate Fast Artificial Neural Networks (FANN) implementations, and a wrapper module that provides interactivity with the FANN implementation and other components of the system.

In an embodiment, a FANN is a multilayer artificial neural network. FANN networks may be fully connected or sparsely connected networks. A FANN network is usually trained using training data sets. A FANN is usually run in two different modes, a training mode and an execution mode.

Figure 6A:
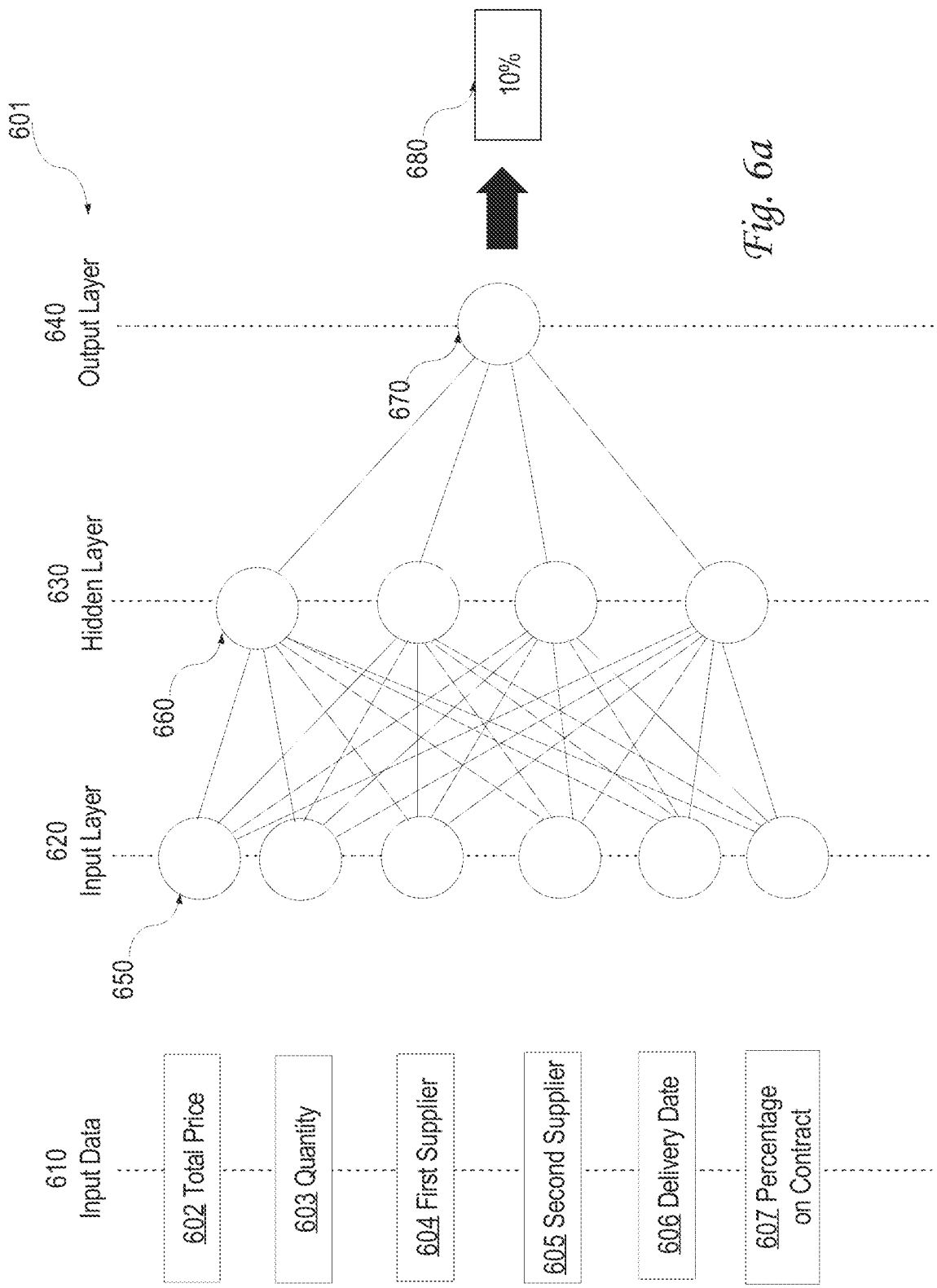
FIG. 6*a* depicts an example neural network used to automatically predict whether a requisition will be rejected.

FIG. 6a depicts an example neural network 601 used to automatically predict whether a requisition will be rejected. Neural network 601 comprises an input layer 620, a hidden layer 630 and an output layer 630. Input layer 620 comprises neurons 650 configured to receive input data 610 and communicate the input data to hidden layer 630. Hidden layer 630 comprises neurons 660 configured to receive data from input layer neurons 650 and communicate the data to output layer 640. Output layer 640 comprises neurons 670 configured to generate output from the received data.

In an embodiment, input data 610 comprises values of different features. The values may be collected from requisition forms, history logs maintained by a procurement system, profiles of users, profiles of suppliers, profiles of approval chains, inventory logs, polices, and the like. For example, input data 610 may include information about a total price 602, information about a quantity 603 of the requested items, information 604-605 about suppliers from whom the items are requested, information about the expected delivery date 606 for the requested items, a percentage on contract 607, and the like. Input data 610 and features are described in detail in FIG. 6b.

In an embodiment, a neural network is represented as a matrix of weights associated with connections between neurons in the network. For example, a neural network may be represented as a two-dimensional matrix indexed by the neurons in the network and having a weight value at the intersection of the rows and columns corresponding to neurons that are connected.

Neurons 650 in input layer 620 are connected with neurons 660 of hidden layer 630, and neurons 660 of hidden layer 630 are connected with neurons 670 of output layer 640. Connections between the neurons may have associated weights. A weight is applied to a value received at one end of the connection to generate an output value for another end of the connection. For example, a value outputted by a first neuron may be multiplied by a weight associated with a connection that connects the first neuron with a second neuron, and the resulting value may be provided as input to the second neuron.

A process of multiplying values by respective weights may be repeated for all layers. As a result, input data 610 received by neurons 650 of input layer 620 may be transformed to an output value 680 outputted by neurons 670 of output layer 640.

Values and weights in a neural network may be represented using data vectors. Data vectors may be defined from the perspective of neurons. For example, input data 610 received by neurons 650 of input layer 620 may be represented by a data vector that comprises one value for each of the neurons in input layer 620. Input values received by neurons 660 of hidden layer 630 may be represented by a data vector that comprises one value for each of neurons 660 in hidden layer 630, and so forth. Weights may be represented by a data vector that comprises one value for each of the connections between input layer 620 and hidden layer 630, and so forth.

Data vectors may also be defined from the perspective of connections established in a neural network. For example, input data 610 received at the first ends of the connections between input layer 620 and hidden layer 630 may be represented by a data vector that comprises one value for each of the neurons 650 in input layer 620. Output values outputted at the second ends of the connections between input layer 620 and hidden layer 630 may be represented by a data vector that comprises one value for each of the neurons in hidden layer 630. Weights may be represented by a data vector that comprises one value for each connection between input layer 620 and hidden layer 630, and so forth.

In an embodiment, a neural network is configured to perform a forward propagation of values. A forward propagation of values comprises a step of receiving outputs from a previous layer, multiplying the received values by weights to derive weighted values to generate input values for the next layer. This process may be repeated by neurons of each layer of the network.

Neural network 601 implemented in a computer system to automatically predict whether a requisition will be rejected or approved may utilize a forward propagation process. The process takes input data 610 and sends input data 610 to neurons 650 of input layer 620. The outputs from neurons 650 are multiplied by weights associated with the respective connections between input layer 620 and hidden layer 630. Resulting values are provided to neurons 660 of hidden layer 630. The outputs from neurons 660 of hidden layer 630 are multiplied by weights associated with the respective connections between hidden layer 630 and output layer 640. Resulting values are provided to one or more neurons 670 of output layer 640 to produce result 680. Result 680 may indicate a probability value that the requisition, for which input data 610 was generated, will be rejected or approved. Various examples of output data are described in FIG. 2b and FIG. 2c.

FIG. 6b depicts examples of features 690 provided as input data to neural network 601. The depicted examples are to be viewed as non-limited examples, and are provided merely to illustrate a particular implementation of neural network 601 in predicting whether a requisition is to be rejected or approved. Other implementations may use some of the depicted features, additional features or completely different features. Examples of features 690 used as input data in neural networks configured to predict whether a requisition is to be rejected or approved are shown in TABLE 1.

TABLE 1

EXAMPLE FEATURES FOR NEURAL NETWORK

On behalf of
\# of policies
Submitter's self-approval limit
\# of requisition lines
Has Justification
Days until need-by date
Address on requisition does not equal user's default
Freeform requests
Total price of order
Non-Preferred Suppliers
\# of commodities
% of items on contract
% of items with p-card
\# of billing strings that do not match default
Has RFQ happened for an item on the req?
Split billing extra allocation count
Submitter rejection %
Approval chain rejection %

TABLE 1-continued

EXAMPLE FEATURES FOR NEURAL NETWORK # of approvers
Buyer action required
Over budget(s)
# of lines with items already in stock
Requisition was previously rejected
# of items on separate order already
User has previously ordered all items on list?

Some of the features may be derived from information about various requisitions submitted for approval in the past. The features may also be derived from information included in form entries provided by a user as the user composes a requisition form. That information may include a description of the items that the user requested, the total cost of the items requested by the user, the delivery date for the requested items, and the like.

Features may also be derived from history logs about requestors and approval chains. For example, some features may pertain to information extracted from profiles maintained for users, profiles of requestors, profiles of suppliers, and the like. Other features may pertain to inventory information maintained by suppliers. For example, some features may pertain to a list of available suppliers, a count of the items available in stock, and the like.

Information about the features may be derived from different sources, including history logs maintained by a procurement system and requisition forms used as training data.

Processing complexity of the information about a feature depends on the type of the feature and the implementation of a procurement system. For example, some features may be processed relatively fast, while other features may be processed rather slowly.

Processing of some features may be optimized to speed up the performance of computer programs executed by a procurement system. Optimization may be accomplished by storing results of expensive function calls in a cache, and returning the cached results when the results are recalled. Other types of optimization may also be implemented.

FANN networks may include weights associated with features and combinations of features. The weights may be dynamically adjusted as the network is trained using training data. The weights are also referred to as weight values.

During a training process, weights for a FANN network are determined. Some of the weights are associated with the features that successfully contribute to the scoring and prediction process, while others are associated with the features that marginally contribute to the scoring and prediction. The weights that successfully contribute are usually those that have relatively high values, while the weights associated with less important features have relatively low values.

A training process of a FANN network begins with determining default values for the weights. The selection of the default values may be based on heuristic approaches, previous experience, or educated guesses. In some situations, even though it may hard to predict which features will be weighted most heavily, the initial values of the weights may be determined based only on educated guesses.

As the training of a FANN network progresses, the weights may be refined and modified until certain criteria are achieved. Examples of the training and examples of the criteria are described below.

Training a neural network for the purpose of determining likelihood that requisitions submitted by users to a procurement system will be rejected or approved may be performed using training data. Training data may include requisition forms that were submitted and approved or rejected in the past, history logs maintained for the previously reviewed requisitions, profiles of users, profiles of approval chains, profiles of suppliers, inventory logs maintained by suppliers, and the like. The training may be performed using any number of requisition forms, and no specific number of requisitions is recommended. However, the larger the number of the requisitions is, the better outcome of the training may be. In some situations, using about 10,000 requisition forms may be sufficient to complete the training of a complex neural network.

Training a neural network usually starts from selecting one or more feature candidates. Some of the examples of the features are described in FIG. 6b-6b. For example, one may select a quantity of the items requested by a user, names of the suppliers from whom the items are requested, a delivery date by which the requested items are to be delivered, and the like.

Selecting the feature candidates may require knowledge of the requisition forms and the types of requests that have been processed by a computer system. In some cases, the features candidates are determined by a team of individuals who are familiar with the nature of the requisitions and the procurement process. The selected individuals may participate in a brainstorm session, during which the feature candidates are identified and selected.

An initial selection of the feature candidates is usually imperfect; in fact, it does not have to be perfect. Even if later on it is determined that some of the selected candidates should be eliminated, the initial selection of the feature does not necessarily impact the quality of the final predictions when the network is deployed to predict whether requisitions will be rejected or approved.

Once feature candidates are selected, values of the features are usually normalized. For example, the values may be normalized so that they fall within the same data range. Selection of a data range may depend on the implementation. In some cases, a typical data range is a [0, 1], in other cases, a data range is a [−1, 1]. Other data ranges may also be defined.

In an embodiment, data sets available for training are divided into training data, validation data, and testing data. The process of dividing the data sets may vary. In some implementations, 60% of the data sets are used as training data, 20% of the data sets are used as validation data, and 20% of the data sets are used as testing data.

In the next step, a starting configuration for a neural network is determined. A typical configuration includes input layer 620, hidden layer 630, and output layer 640, as depicted in FIG. 6a. Usually, one hidden layer 630 is sufficient; however, more complex configurations may also be considered.

Selection of the size of hidden layer 630 may depend on the implementation. However, usually the size of the hidden layer 630 is between the size of input layer 620 and output layer 640. Initially, the size of hidden layer 630 may correspond to the size of input layer 620.

Below is an example of the process of defining a neural network and training the network using training data. An example configuration of the neural network used by a procurement system may include 100 neurons 650 in input layer 620, 100 neurons 660 in hidden layer 630, and one neuron 670 in output layer 640. The structure of this particular neural network may be encoded as in expression (1).

$$100 \text{ inputs} \rightarrow 100 \text{ hidden nodes} \rightarrow 1 \text{ output} \quad (1)$$

A definition of a neural network used by a procurement system may be encoded using a variety of ways. One example of the encoding is provided below. In the example, the neural network has been prepared in conjunction with RUBY ON RAILS and is named "RubyFann." The training data is ported from a file or a data structure called "Train-Data_new." An example of definition of a neural network may be encoded using the pseudo code of TABLE 2.

TABLE 2

EXAMPLE NEURAL NETWORK DEFINITION train_data = RubyFann::TrainData.new (inputs: inputs, desired_outputs: outputs)
fann = RubyFann::Standard.new (num_inputs: inputs.first.size, hidden_neurons: [100], num_outputs: 1)     (2)

Once a neural network is defined, the network may be trained using training data sets. The training process may be repeated multiple times. In some implementations, the training process may be repeated up to 1000 times using the same or different data sets.

An artificial neural network may be trained using various approaches. For example, an artificial neural network may be trained using a method utilizing a backward propagation of errors. That approach is also referred to as a backpropagation. A backpropagation method calculates a gradient of a loss function with respects to the weights determined for the network. The gradient is then provided to an optimizer that determines whether the weights may be updated to minimize the loss function. By refining the weights and the loss function, the method allows finding a function that best maps a set of inputs provided to a first layer of the network to a set of outputs received from the last layer of the network. The mapping corresponds to an internal representation of the network. Once the training is completed, the internal representation of the network is used to map arbitrary inputs provided to the first layer of the network to desired outputs obtained from the last layer of the network.

In an embodiment, a training of a neural network includes two stages. A first stage may include propagating input training pattern inputs forward from the first layer of the network toward the last layer to generate propagation output activations. Then the propagation output activations are propagated backward to generate difference values for the outputs generated in the backward direction. In the second stage, the difference values and the input activation values are multiplied to obtain a gradient value. Then, a percentage of the gradient value is subtracted from the weights.

A percentage of the gradient value is often referred to as a learning rate. The greater the learning rate, the sooner the training of the network is completed. However, the smaller the learning rate, the more accurate the training process is.

Once both stages are completed and the weights are updated, the forward and backward propagations may be repeated. The propagations may be repeated multiple times until the desired mapping between the inputs provided to the first layer of the network and the outputs from the last layer of the network is obtained.

As the training progresses, outputs generated by a neural network may be validated against validation data sets. For example, after repeating the training process 10 times, 20 times, and so forth, each of the outputs generated by the neural network may be validated against the validation data set to make sure that the network performance is generally improving. The performance is generally not improving if, for example, the network becomes tuned to predict only the training set. This is often referred to as over-fitting. After repeating the training and validation processes several times, performance data may be saved as a baseline. The process of obtaining the baseline data may be encoded using the pseudo-code of TABLE 3.

TABLE 3

EXAMPLE CODE FOR OBTAINING BASELINE DATA base_mse = 1.0 # mean squared error     (3)
100.times do
   fann.train_on_data (train_data, 10, 5, 0.01)
   fann.test (validation_inputs, validation_outputs)
   mse = fann.get_MSE
   return if mse < base_mse
   base_mse = mse
end
fann.test (test_inputs, test_outputs)
baseline_performance = fann.get_MSE
   wherein:
value 10 represents the maximum number of epochs (times through the training set),
value 5 represents a count of epochs to wait before printing status,
value 0.01 represents a desired error.

The training process may be terminated when the output value exceeds the desired error value. In the next step, weights are examined for the defined neural network. If there are weight values derived from neurons 650 of input layer 620 that are close to zero, then at least some of them are pruned. For example, out of the weight values that are close to zero, three lowest values may be pruned. These weights and corresponding input neurons are pruned because they do not contribute to the scoring and prediction process.

In the next step, a neural network is rebuilt by reducing a count of hidden neurons 660 in hidden layer 630 to match a count of input neurons 650 in input layer 620. For example, if after pruning some of the weights, a count of input neurons 650 in input layer 620 is 50, then a count of hidden neurons 660 in hidden layer 630 will be reduced to 50. At this point, the structure of the neural network may be encoded as in expression (4).

$$50 \text{ inputs} \rightarrow 50 \text{ hidden nodes} \rightarrow 1 \text{ output} \quad (4)$$

The training process is repeated until the baseline value stops improving. At this point, most likely the irrelevant inputs have been removed. If the results are satisfactory, then the process of defining and training the neural network may be discontinued, and the obtained neural network may be used to generate predictions in real-time.

At any time the training steps may be repeated to improve the performance and accuracy of the predictions. In some situations, the training steps may be repeated even if the performance of the prediction is satisfactory. For example, the steps may be repeated to incorporate periodic updates, which become available as new requisitions are reviewed and new history logs are created. Hence, when new data becomes available, the training process may be repeated and the new data may be included in the training process.

A neural-network-based approach for predicting likelihood that a requisition will be rejected by a procurement system may be implemented for a variety of enterprises. The determination whether a requisition will be rejected using the neural networks may simplify the process of submitting requisitions to procurement systems, and may improve the efficiency of the procurement system.

6.0 Example Query-Based Implementation

In an embodiment, an automated computer-based prediction of rejections of requisitions is implemented using a query-based approach. The query-based approach may be customized to needs and requirements of a particular business enterprise, or may be customized to requirements provided by various companies specializing in various areas of technology. A query-based approach may provide a prediction value indicating whether a particular requisition will be rejected if the requisition is indeed reviewed by an approval chain of a procurement system. For example, the prediction value may indicate that requisitions similar to the particular requisition are rejected 30% of the time. The implementation may incorporate customized modules, as well as generic modules, open-source code, licensed components, and the like.

Figure 7:
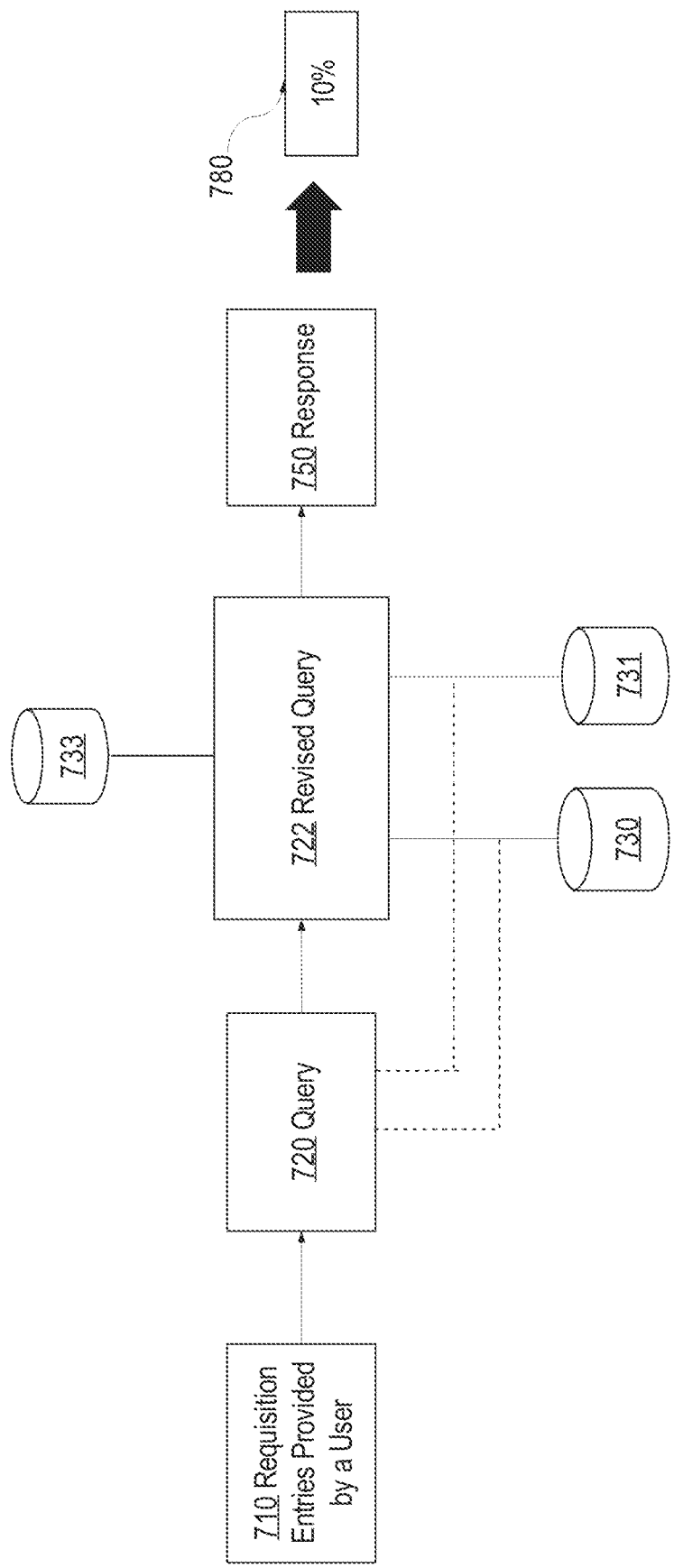
FIG. 7 depicts an example data flow in a database-query-based-process to automatically predict whether a requisition will be rejected.

FIG. 7 depicts an example data flow in a database-query-based-process for automatic prediction of rejections of requests. In the example, requisition entries 710 provided by a user are received via a GUI of a procurement system. Entries 710 are intercepted as the user is composing a requisition form and prior to actually submitting the requisition form itself to the procurement system.

A prediction unit parses the received entries, and uses the parsed information to formulate a query 720. Query 720 may be a Structured Query Language (SQL) query, or any other type of query known in the art. Query 720 may be generated based on not only the parsed information, but also information retrieved from other depositories, such as history logs, profiles, inventory catalogs, and the like. The depositories may be stored in databases 730, 731.

Query 720 may be communicated to a scoring unit of a procurement system. The scoring unit may parse the query and extract one or more elements of the query. Furthermore, the scoring unit may access one or more databases 730, 731, to retrieve additional information about the requisitions, users, suppliers, approval chains and the like, to generate a revised query 722. The revisions may include augmenting and or redacting query 720 by adding additional information about the user, suppliers and other queries.

Revised query 722 is processed to generate a query execution plan, which is then executed against data stored in one or more databases 733. Data stored in database 733 is used to generate results for revised query 722. The data may include information about previously rejected and or approved queries, likelihood information generated for various types of queries, and the like.

An execution plan may be executed against data stored in database 733 to generate results for revised query 722. For example, the execution of revised query 722 may result in determining a probability value that a particular requisition will be rejected by approval chains if the corresponding requisition is indeed submitted to a procurement system.

Once a scoring unit receives one or more results generated for the query, the scoring unit processes the results and uses the processed results to generate a response 750. Response 750 may include a probability value which indicates a probability that a particular requisition will be rejected, or a probability that a particular requisition will be approved. For example, response 750 may include a probability value 780 of 10% to indicate that there is a 10% chance that the corresponding requisition will be rejected by approval chains of the procurement system if the requisition is submitted to the approval chains as is.

Response 750 may also include additional information, such as comments or suggestions for potentially revising the requisition to increase the likelihood that the requisition will be approved.

Response 750 may be communicated to a client device and displayed in a browser executed on the client device. In addition, one or more text files containing comments and suggestions for revising the requisition may be communicated to the client device and displayed in the browser.

A query-based approach for predicting likelihood that a requisition will be rejected by a procurement system may be implemented in various procurement systems. The determination whether a requisition will be rejected using the query-based approach may simplify the process of submitting requisitions to procurement systems and improve efficiency of the procurement system.

7.0 Example Prediction-Algorithm-Based Implementation

In an embodiment, an automated computer-based prediction of rejections of requisitions is implemented using prediction algorithms. Prediction algorithms may use one or more predictive models generated from statistical and training data. The models may implement various modeling techniques, including a parametric and a non-parametric modeling.

Predictive modeling is a process used in predictive analytics to create a statistical model of future behavior. A statistical model may provide a prediction value indicating whether a particular requisition will be rejected if the requisition is indeed reviewed by an approval chain of a procurement system. For example, the prediction value may indicate that requisitions similar to the particular requisition were rejected 75% of the time. Groups of similar requisitions may be referred to as clusters. The implementations may incorporate customized modules, as well as generic modules, open-source code, licensed components, and the like.

Figure 8:
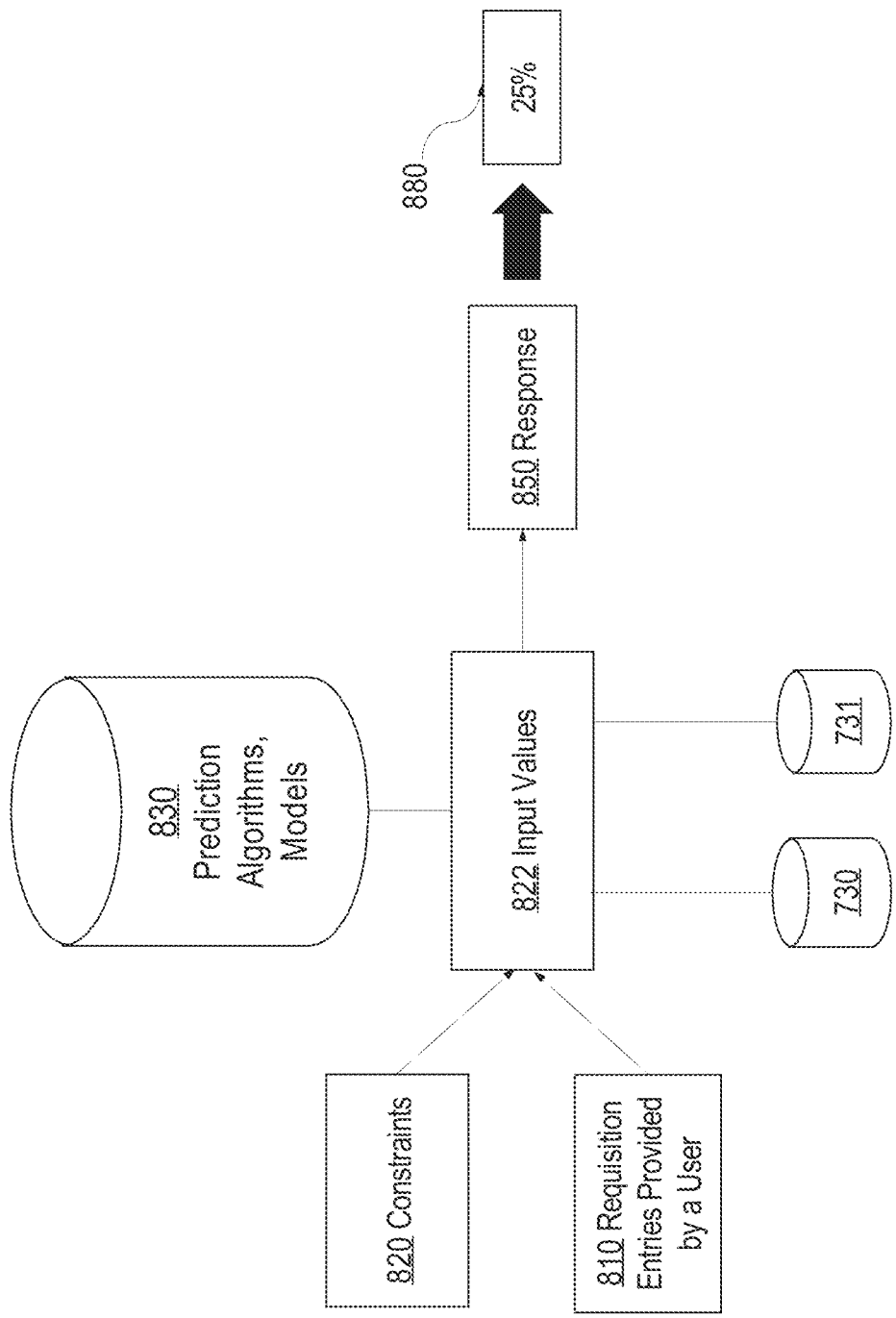
FIG. 8 depicts an example data flow in a prediction algorithm-based-process to automatically predict whether a requisition will be rejected.

FIG. 8 depicts an example data flow in a prediction algorithm-based-process for automatic prediction of rejections or requests. In the example, requisition entries 810 provided by a user are received via a GUI of a procurement system and provided to a prediction unit of the procurement system. The prediction unit parses the received entries, and provides the parsed information to a scoring unit of the procurement system.

In addition to providing the parsed information, a prediction unit may also provide constraint values 820 to a scoring unit. The constraint values 820 may be determined based on information retrieved from various depositories, such as history logs, profiles, catalogs, and the like. The depositories may be stored in databases 730, 731.

Upon receiving parsed requisition data and constraint values 820, a scoring unit may parse the received information and generate input values for one or more predictive models. The scoring unit may also access one or more databases 730, 731, and retrieve additional information about the requisitions, users, suppliers, approval chains and the like.

Furthermore, a scoring unit may determine one or more predictive models that are applicable to requisition entries 810, and select one or more predictive models to be used to generate a response 850. The selected models may be retrieved from database 830 and provided to the scoring unit.

A scoring unit may also determine one or more prediction algorithms that are applicable to requisition entries 810, and retrieve the prediction algorithms from database 830.

Once at least one predictive model and one predictive algorithm are retrieved, a scoring unit initiates execution of the predictive algorithms against the predictive models. Using input values 822, a statistical model is generated. Generating the statistical model will result in obtaining a response 850.

Response 850 may include a probability value which indicates a probability that a particular requisition will be rejected if the requisition is submitted for review as is. For example, response 850 may include a probability value 880 of 25% to indicate that there is a 25% chance that the requisition will be rejected by approval chains of the procurement system.

Response 850 may also include additional information, such as comments or suggestions for potentially revising the requisition to increase the likelihood that the requisition will be approved.

Response 850 may be communicated to a client device to be displayed in a browser executed on the client device. In addition, one or more text files containing comments and suggestions for revising the requisition, may be communicated to the client device to be displayed in the browser.

A prediction-algorithm-based approach for predicting likelihood that a requisition will be rejected by a procurement system may simplify the process of submitting requisitions to procurement systems and efficiency of the procurement system.

Predicting likelihood that a requisition will be rejected may be implemented using approaches other than those described above. For example, the predicting may be implemented using algorithms for determining K nearest requisition-neighbors of the submitted requisition. Once the K nearest requisition-neighbors are determined, the information whether those requisitions were rejected or approved may be used to predict whether the submitted requisition will be rejected or approved. The requisition neighbors may be determined based on similarities identified in the corresponding requisition forms. For example, if there are 100 old requisitions that are similar to the currently composed requisition, and 75 of the 100 old requisitions were rejected, then the probability that the currently composed requisition will be rejected may be 75%.

Other algorithms also used herein may include rule extraction algorithms. An example rule extraction algorithm is an algorithm that utilizes artificial neural networks (RE-ANN). Rule extraction algorithms may be implemented using fuzzy logic techniques.

Presented approaches for predicting whether a requisition will be rejected provide numerous benefits, such as simplifying the process of submitting requisitions to procurement systems and improving efficiency of the system.

8.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
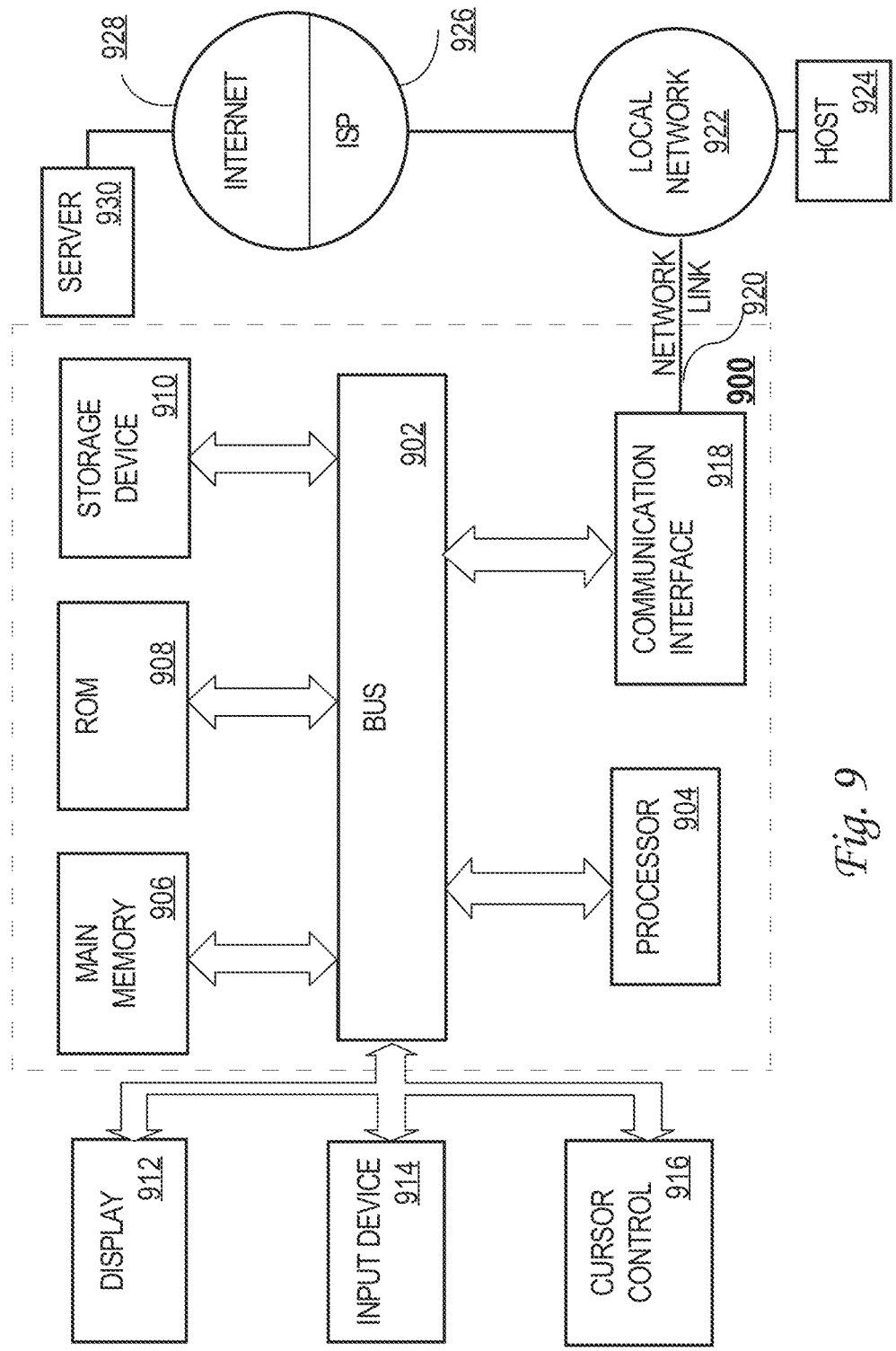
FIG. 9 depicts a computer system with which embodiments may be implemented.

For example, FIG. 9 depicts a computer system with which embodiments may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (LCD, CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A computer-implemented method comprising:
receiving at a computer system and digitally storing local statistical information and global statistical information for electronic digital past request data representing past requests of client devices that were submitted via a computer system and that were reviewed in an approval chain that comprises a series of approval computers, the local statistical information being associated with past requests of client devices of a particular enterprise and the global statistical information being associated with past requests of other enterprises;
the computer system receiving, from a client device, electronic digital requisition data representing a request;
generating, in real time in response to the request, and based on the request and the local statistical information and global statistical information for electronic digital past request data representing past requests, a probability value indicating a likelihood that the request will be rejected if the request is submitted to the computer system for processing in the approval chain;
causing the client device to display a graphical user interface that includes the request and a message that includes the probability value;
generating the probability value by executing a neural network using request data values of the request;
training the neural network by assigning one or more weight values to connections between neurons of the neural network; providing the past request data to the neural network as training data; repeating the training, until output generated by the neural network indicates, within an error value not exceeding a threshold value, that processing the past request data by the neural network results in the neural network predicting an approval of the past request data.

2. The computer-implemented method of claim 1, the neural network comprising a Fast Artificial Neural Network (FANN).

3. The computer-implemented method of claim 1, the training data being obtained from requisition forms that were submitted and approved or rejected previously, history logs maintained for previously reviewed requisitions, profiles of users, profiles of approval chains, profiles of suppliers, inventory logs of suppliers.

4. The computer-implemented method of claim 1, the neural network comprising an input layer configured with neurons to receive, from the requisition data, at least total price, quantity, first supplier, second supplier, delivery date, and percentage of contract.

5. The computer-implemented method of claim 1, the request comprising any of an invoice, expense report, personal request, employee suggestion submission.

6. The computer-implemented method of claim 1, the request comprising a purchase requisition and the past request data for each of the past requests comprising a plurality of different requisition data values identifying at least a vendor, one or more products that the vendor is to supply, and one or more metadata values from among order date, date required, shipper, freight terms, shipping address.

7. The computer-implemented method of claim 1, further comprising retrieving from storage and causing displaying an explanation of why the request data indicates a high probability that a particular request will be rejected if submitted.

8. The computer-implemented method of claim 1, the local statistical information and global statistical information comprising any of a count of requested items in a request, availability of items in a request, whether requested items were approved in the past, whether requested items meet a quality threshold, whether a supplier of requested items is local, whether fulfilling similar requests for similar items was successful in the past.

9. The computer-implemented method of claim 1, further comprising parsing justification content of a justification in the request to identify keywords and testing whether the keywords have been also used in requests that were approved in the past.

10. The computer-implemented method of claim 1, further comprising determining suggestions for rewriting the request by changing supplier from whom items are requested, changing a requested delivery date of requested items, changing a quantity of requested items.

11. The computer-implemented method of claim 1, further comprising causing to display the probability value in a computer display screen logically near or on the request data or a portion of the request data.

12. The computer-implemented method of claim 1, further comprising causing to display the message specifying the likelihood that the request will be approved.

13. The computer-implemented method of claim 1, the request comprising a purchase requisition, the method further comprising generating the probability value by determining a K nearest requisition-neighbors to the request and determining the probability value as a percentage of the K nearest requisition-neighbors that were rejected.

14. A non-transitory computer-readable storage medium storing one or more sequences of instructions which, when executed by one or more processors, cause the one or more processors to perform:
receiving at a computer system and digitally storing local statistical information and global statistical information for electronic digital past request data representing past requests of client devices that were submitted via a computer system and that were reviewed in an approval chain that comprises a series of approval computers, the local statistical information being associated with past requests of client devices of a particular enterprise and the global statistical information being associated with past requests of other enterprises;
the computer system receiving, from a client device, electronic digital requisition data representing a request;
generating, in real time in response to the request, and based on the request and the local statistical information and global statistical information for electronic digital past request data representing past requests, a probability value indicating a likelihood that the request will be rejected if the request is submitted to the computer system for processing in the approval chain;
causing the client device to display a graphical user interface that includes the request and a message that includes the probability value;
generating the probability value by executing a trained neural network using request data values of the request;
training the neural network by assigning one or more weight values to connections between neurons of the neural network; providing the past request data to the neural network as training data; repeating the training, until output generated by the neural network indicates, within an error value not exceeding a threshold value, that processing the past request data by the neural network results in the neural network predicting an approval of the past request data.

15. The non-transitory computer-readable storage medium of claim 14, the neural network comprising a Fast Artificial Neural Network (FANN).

16. The non-transitory computer-readable storage medium of claim 14, the training data being obtained from requisition forms that were submitted and approved or rejected previously, history logs maintained for previously reviewed requisitions, profiles of users, profiles of approval chains, profiles of suppliers, inventory logs of suppliers.

17. The computer-implemented method of claim 1, the local statistical information and global statistical information comprising any of a count of requested items in a request, availability of items in a request, whether requested items were approved in the past, whether requested items meet a quality threshold, whether a supplier of requested items is local, whether fulfilling similar requests for similar items was successful in the past.

18. The computer-implemented method of claim 1, the request comprising a purchase requisition, the method further comprising generating the probability value by determining a K nearest requisition-neighbors to the request and determining the probability value as a percentage of the K nearest requisition-neighbors that were rejected.

\* \* \* \* \*